Jan. 13, 1959
R. TICCHIONI
2,868,876
VOCAL DEVICE
Filed June 20, 1952
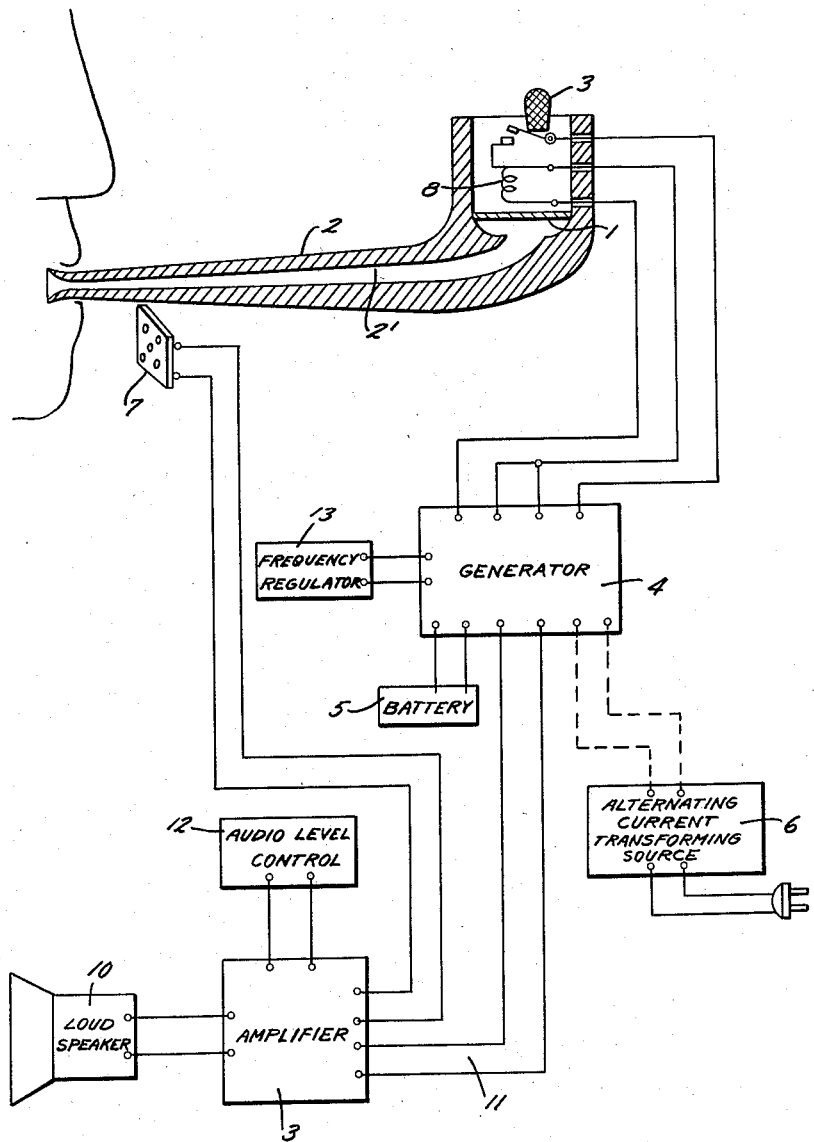
INVENTOR.
RUGGERO TICCHIONI
BY *Michael S. Striker*
ATTORNEY.

2,868,876

Patented Jan. 13, 1959

2,868,876

VOCAL DEVICE

Ruggero Ticchioni, Milan, Italy

Application June 20, 1952, Serial No. 294,574

Claims priority, application Italy June 23, 1951

7 Claims. (Cl. 179—1)

The present invention relates to devices enabling persons lacking vocal chords to generate articulated audible sounds.

Devices for enabling persons lacking vocal chords to generate articulated audible sounds are known. One such known device is applied to the neck of the individual who wishes to generate articulated audible sounds. In this case the sounds are generated by vibrations of the skin of the individual on whose neck said device is applied.

Another known device generates articulated audible sounds by means of an artificial larynx. To use a device of this nature requires a person wishing to generate articulated audible sounds to undergo surgical operation.

The aforementioned devices have been found extremely uncomfortable to the user, thus limiting their practical application.

It is an object of this invention to provide a device for generating articulated audible sounds which is neat appearing and compact.

It is another object of this invention to provide a device enabling persons lacking vocal chords to generate articulated audible sounds and whose operation does not depend on the breathing of the user.

It is yet another object of the present invention to provide a device for generating articulated audible sounds which transforms vibrations set up in a suitable air passage to articulated audible sounds in the oral cavity of the user of the device. The transformation of the vibrations in the oral cavity of the person seeking to generate articulated audible sounds does not require such person to make the lest effort to speak.

An embodiment of the present invention involves a device enabling persons lacking vocal chords to generate articulated audible sounds comprising an elongated member formed with an air passage along the length thereof, one end of the member adapted for insertion into a person's mouth, vibratable means arranged near the other end of the member and closing the air passage, means for vibrating the vibratable means at a predetermined frequency, whereby air vibrations are set up in the air passage having a predetermined wave shape and frequency similar to those generated by human vocal chords, the air vibrations being transmitted through the one end of the elongated member where they may be modified by the tongue of the person into whose mouth the one end of the elongated member is inserted, the articulated audible sounds being generated in the oral cavity of the prson into whose mouth the one end of the elongated member is inserted.

Another embodiment of the present invention involves a device enabling persons lacking vocal chords to generate articulated audible sounds comprising an elongated member having the shape of a smoking pipe and formed with an air passage along the length thereof, one end of the member adapted for insertion into a person's mouth, vibratable means arranged near the other end of the member and closing the air passage, means for vibrating the vibratable means at a predetermined frequency, whereby air vibration are set up in the air passage having a predetermined wave shape and frequency similar to those generated by human vocal chords, the air vibrations being transmitted through the one end of the elongated member where they may be modified by the tongue of the person into whose mouth the one end of the elongated member is inserted, the articulated audible sounds being generated in the oral cavity of the person into whose mouth the one end of the elongated member is inserted.

The novel features which are considered as characteristic for the invention are set forth in particular in the appended claims. The invention itself, however, both as to its construction and its method of operation, together with additional objects and advantages thereof, will be best understood from the following description of the drawing which illustrates a preferred embodiment of the invention in diagrammatic form.

Referring to the drawing, a magnetizable membrane 1 is illustrated as being arranged in the bowl portion of the smoking pipe shaped member 2. The pipe shaped member 2 is formed with an air passage 2' along the length thereof, one end of said pipe shaped member being adapted for insertion into a person's mouth. A solenoid 8 is arranged adjacent to said magnetizable membrane so that when the solenoid 8 is energized by an alternating current flowing therethrough the magnetizable member will be vibrated at the frequency of the alternating current flowing through said solenoid 8. A generator of alternating current 4 is connected to the solenoid 8 for energizing the same. The generator 4 is designed to generate alternating current oscillations at predetermined frequencies preferably within the range of audio frequencies of articulated sounds. The generator 4 is set into operation by means of on-off switch 3 and obtains its supply voltage from battery 5 or if desired from an alternating current transforming source 6.

A frequency regulator 13 is used to adjust the generator 4, when required, and serves to alter the tone of the articulated audible sounds by changing the frequency of the alternating current oscillations generated by generator 4.

The device for generating articulated audible sounds operates as follows:

The smoking pipe shaped member 2 is inserted at one end thereof into the mouth of the person wishing to generate articulated audible sounds. The contacts of switch 3 are closed thereby setting generator 4 in operation. The output of generator 4 is connected to the solenoid 8 which in turn will generate a magnetic field as a result of the alternating current flowing therethrough. The magnetizable membrane 1 will be vibrated by the action of the magnetic field generated by the alternating current flowing through said solenoid at the frequency of the alternating current oscillations generated by generator 4. As a result of the vibrations of the magnetizable membrane 1, air vibrations are set up in the air passage 2' having a predetermined wave shape and frequency similar to those generated by human vocal chords. These air vibrations are transmitted through the end of the elongated member inserted into the mouth of the person desiring to generate articulated audible sounds where these air vibrations may be modified, for instance, by the tongue of the person into whose mouth said one end of the pipe shaped member is inserted. The articulated audible sounds are generated in the oral cavity of such person who keeps his mouth partially open when using the device in accordance with the invention so that the articulated sounds may escape from the oral cavity into space.

In this manner the whole alphabet may be uttered, together with a given range of musical notes. If the device in accordance with the invention is to be used by a man and the articulated audible sounds are voiced in a high pitch, characteristic of women's speech, an adjustment of the frequency of the alternating current oscillations generated by generator 4 may be made by means of frequency regulator 13 so that a true male voice is generated.

If the articulated audible sounds emanating from the oral cavity are too weak to be heard, then a microphone 7 in conjunction with an amplifier 9 and a loudspeaker 10 may be used to amplify the weak articulated audible sound. Cable 11 serves to connect the requisite voltages necessary for the operation of the amplifier 11 from the generator 4 to said amplifier. An audio level control 12 is connected to the amplifier 9 and permits the control of the output level of the articulated audible sounds.

The device in accordance with the invention may be conveniently carried in the pocket of the person desiring to use the same or if desired in a case or bag.

It will be understood that each of the elements described above, or two or more together, may also find a useful application in other types of audible sound generating means differing from the types described above.

Having now particularly described and ascertained the nature of my said invention, and in what manner the same is to be performed, I declare that what I claim is:

1. A device enabling persons lacking vocal chords to generate articulated audible sounds comprising in combination, an elongated member having the shape of a smoking pipe and formed with a tubular air passage along the length thereof, said air passage having a substantially wider diameter in the bowl portion of said pipe-shaped elongated member than in the stem portion thereof, one end of said member adapted for insertion into a person's mouth; vibratable means arranged in the bowl portion of said pipe shaped member and closing said air passage for setting up air vibrations therein; and a generator for vibrating said vibratable means at a constant predetermined frequency.

2. A device enabling persons lacking vocal chords to generate articulated audible sounds comprising in combination, an elongated member having the shape of a smoking pipe and formed with a tubular air passage along the length thereof, said air passage having a substantially wider diameter in the bowl portion of said pipe-shaped elongated member than in the stem portion thereof, one end of said member adapted for insertion into a person's mouth; vibratable means arranged in the bowl portion of said pipe shaped member and closing said air passage for setting up air vibrations therein; a generator for vibrating said vibratable means at a constant predetermined frequency and means for regulating the constant frequency at which said vibratable means is vibrated.

3. A device enabling persons lacking vocal chords to generate articulated audible sounds comprising in combination, an elongated member having the shape of a smoking pipe and formed with a tubular air passage along the length thereof, said air passage having a substantially wider diameter in the bowl portion of said pipe-shaped elongated member than in the stem portion thereof, one end of said member adapted for insertion into a person's mouth; vibratable means arranged in the bowl portion of said pipe shaped member and closing said air passage; a generator for vibrating said vibratable means at a constant predetermined frequency for setting up in said air passage air vibrations having a predetermined wave shape and frequency similar to those generated by human vocal chords, said air vibrations being transmitted through said one end of said elongated member where they may be modified by the tongue of the person into whose mouth said one end of said elongated member is inserted, the articulated audible sounds being generated in the oral cavity of the person into whose mouth said one end of said elongated member is inserted; means for regulating the constant frequency at which said vibratable means is vibrated; and means for amplifying the articulated audible sounds generated in the oral cavity of the person into whose mouth said one end of said elongated member is inserted.

4. A device enabling persons lacking vocal cords to generate articulated audible sounds comprising, in combination, a pipe-shaped elongated member having a bowl portion and a stem portion and being formed with a tubular air passage along the length thereof, said air passage having a substantially wider diameter in said bowl portion than in said stem portion, said stem portion being adapted for insertion into a person's mouth; a magnetizable membrane arranged in the bowl portion of said pipe-shaped member and closing said tubular air passage for setting up air vibrations therein; magnetizing means arranged adjacent said magnetizable membrane for generating a magnetic field when current flows therethrough; a generator for generating current at a constant predetermined frequency to energize said magnetizing means and produce vibrations of said membrane at said constant predetermined frequency; and means for regulating the constant frequency at which said current is generated by said generator.

5. A device enabling persons lacking vocal cords to generate articulated audible sounds comprising, in combination, a pipe-shaped elongated member having a bowl portion and a stem portion and being formed with a tubular air passage along the length thereof, said air passage having a substantially wider diameter in said bowl portion than in said stem portion, said stem portion being adapted for insertion into a person's mouth; a magnetizable membrane arranged in the bowl portion of said pipe-shaped member and closing said tubular air passage for setting up air vibrations therein; magnetizing means arranged adjacent said magnetizable membrane for generating a magnetic field when current flows therethrough; a generator for generating current at a constant predetermined frequency to energize said magnetizing means and produce vibrations of said membrane at said constant predetermined frequency, thereby setting up air vibrations in said tubular air passage having a predetermined wave shape and frequency similar to those generated by human vocal cords, said air vibrations being transmitted through said stem portion of said pipe-shaped member where they may be modified by the tongue of the person into whose mouth said stem portion is inserted, the articulated audible sound being generated in the oral cavity of the person into whose mouth said stem portion is inserted; means for regulating the constant frequency at which said current is generated by said generator; and means including a microphone connected to an amplifier for amplifying the articulated audible sounds generated in the oral cavity of the person into whose mouth said stem of said pipe-shaped member is inserted.

6. A device enabling persons lacking vocal chords to generate articulated audible sounds, comprising, in combination, a member formed with an air passage therethrough and being adapted to be inserted into a person's mouth in such a manner that one end of said air passage communicates with the mouth of the person; vibratable means arranged near the other end of said air passage and closing the same for setting up air vibrations therein; and means energizable by a source of energy extraneous from the person for vibrating said vibratable means.

7. A device enabling persons lacking vocal chords to generate articulated audible sounds comprising, in combination, a smoking pipe-shaped member having a stem portion and a bowl portion, said pipe-shaped member having an air passage therethrough which has a substantially greater diameter in said bowl portion than in said stem portion; vibratable means arranged in said bowl portion of said pipe-shaped member and closing said air passage for setting up air vibrations therein; and means energizable by a source of energy extraneous from the person for vibrating said vibratable means.

References Cited in the file of this patent

UNITED STATES PATENTS

| | | |
|---|---|---|
| 1,521,287 | Gernsback | Dec. 30, 1924 |
| 1,929,569 | Stone | Oct. 10, 1933 |
| 2,167,377 | Schwencke | July 25, 1939 |
| 2,230,397 | Abraham | Feb. 4, 1941 |
| 2,273,077 | Wright | Feb. 17, 1942 |
| 2,273,078 | Wright | Feb. 17, 1942 |
| 2,355,287 | Firestone | Aug. 8, 1944 |
| 2,374,090 | French | Apr. 17, 1945 |